Nov. 3, 1953     J. J. COLEMAN ET AL     2,658,098
DRY BATTERY WITH CONDUCTIVE TAPE INTERCELL CONNECTIONS
Filed March 22, 1951
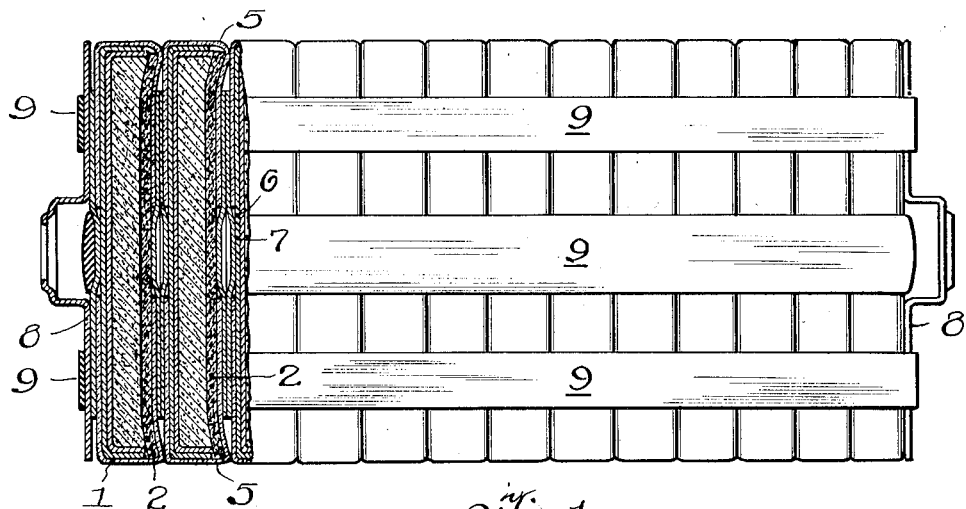
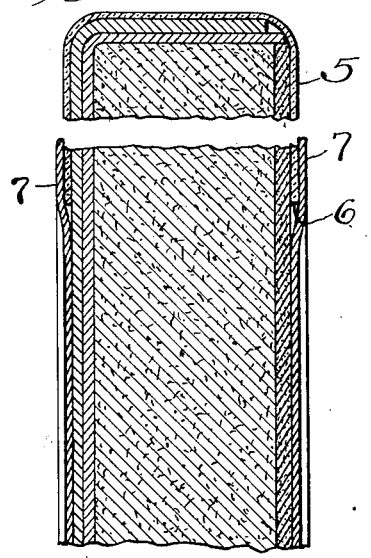
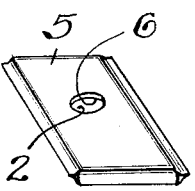
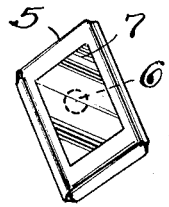
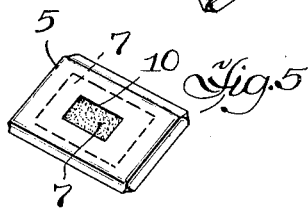
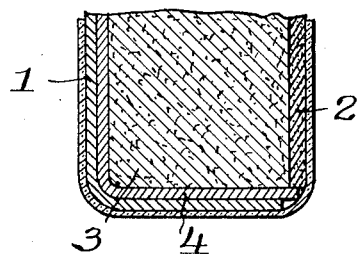
Inventors,
Joseph J. Coleman
and Sam Kurlandsky
By: Jones, Tesch and Darby Attys.

Patented Nov. 3, 1953

2,658,098

UNITED STATES PATENT OFFICE 2,658,098

DRY BATTERY WITH CONDUCTIVE TAPE INTERCELL CONNECTIONS

Joseph J. Coleman, Freeport, and Sam Kurlandsky, Rock Island, Ill., assignors to Burgess Battery Company, Freeport, Ill., a corporation of Delaware Application March 22, 1951, Serial No. 217,046

7 Claims. (Cl. 136—111)

This invention relates to electric dry cell batteries and aims particularly to provide an improved method for connecting the cells of such batteries.

Batteries having desired voltage characteristics are constructed by electrically connecting the requisite number of individual cells in series. Cells of either the round or flat type may be employed, the latter having some advantage where space economy is an important factor in the finished product.

Several methods have heretofore been employed for connecting the terminals of adjacent cells of the series. The terminals or lead wires may be soldered together, for example, and cells of the flat type are frequently connected together merely by physical contact between the surfaces of the opposite electrons of adjacent cells. More recently it has been proposed to employ a non-solder conductive composition to one or both surfaces of the electrodes of flat cells to be connected together in order to insure an adequate and permanent electrical connection.

An object of the present invention is to provide improved means for electrically connecting opposite electrodes of the adjacent flat cells of an electric dry battery. This objective is attained by using an electrically conductive adhesive tape; that is, a tape having both a conductive backing and a conductive adhesive coating. The conductive adhesive coating of the tape may intimately engage the surfaces of the cell electrodes, provision being made to secure contact between the tape segments so adhesively and electrically connected with the opposite electrodes of adjacent cells.

A further object of the invention is to provide means for effectively and simultaneously sealing and providing for the electrical connection of cells through apertures provided for the purpose in the wrappers or envelopes within which the individual cells are contained.

Exemplificational embodiments of the invention are illustrated in the accompanying drawings, in which Fig. 1 is a side elevational view, partly in section, of a flat cell battery having intercell connections made in accordance with the invention;

Fig. 2 is an enlarged sectional view of a single cell of the battery of Fig. 1;

Fig. 3 is a perspective view of a single cell before application of the conductive adhesive tape;

Fig. 4 is a perspective view of the cell of Fig. 3 with a segment of tape applied;

Fig. 5 is a perspective view of a single cell showing a modified form of the invention, and Fig. 6 illustrates the electrically conductive adhesive tape employed in making intercell connections in accordance with the invention.

The basic unit from which the dry batteries are fabricated is the known cell structure illustrated in Fig. 3, details being shown in Fig. 2. The invention is not limited to cells employing any particular electrochemical system or active elements. That shown by way of example in Fig. 2 is a cell of the Leclanche type having a tray-shaped zinc negative electrode 1, a suitable positive electrode, usually a carbon element 2, a depolarizing mix cake 3, and the usual separator 4. It will be understood, of course, that the electrolyte is contained in the mix and the separator.

The cell comprising these ingredients is entirely enclosed within an envelope 5 of a suitable inert film material, such as a polyethylene or rubber hydrochloride. Apertures 6 are provided in the central part of the portions of the envelopes covering the broad sides of the cells to expose a portion of each electrode.

These apertures should be large enough to permit adequate electrical connection, leaving as large a margin of envelope as possible. They may be punched in the film material prior to the wrapping of the cells or may be formed in thermoplastic film material after completion of the wrapping operation by means of a suitable heated punch.

The completed cells with apertured envelopes may be sealed and means provided for the electrical interconnection of the cells in a battery by the application of a segment 7 of electrically conductive adhesive tape to the sides of the cells having the apertured coverings, as shown in Figs. 2 and 4. The tape used for this purpose (11, Fig. 6) consists of an electrically conductive backing 12 having an electrically conductive adhesive coating 13. Since the entire structure of the tape is electrically conductive, electricity may flow in both lateral and transverse directions through the tape.

Segments 7 of the conductive tape are pressed firmly against the electrode and envelope surfaces to establish good electrical contact and an effective seal for the cells. The number of cells necessary to provide the desired battery voltage are then stacked with the conductive tape elements of contiguous cells in contact to establish the desired intercell connection. The assembly is illustrated in Fig. 1, suitable terminal plates 8 being arranged at the ends of the stack of cells and tapes 9 being provided to hold the assembly together with the tape intercell connectors in pressure contact with each other. If, as is preferable, carbon electrode elements 2 are flexible, the cells will readily conform to the space provided for them as they are pressed together in the assembly. This is illustrated with some exaggeration in Fig. 1, the film materials being shown with disproportionate thicknesses because of drafting limitations.

It will be understood from the foregoing description that the current from the electrode of one cell flows to a conductive tape segment through the conductive adhesive coating at the area of contact between the electrode and tape, that the current then flows laterally in the conductive backing of the tape, and that the current then passes on to the next cell through contact of the marginal portions of the tape backing with that of the adjacent cell. In this way, complete series connection is made from terminal to terminal of the battery.

The electrically conductive adhesive tape may consist of a backing of any suitable conductive sheet material, such as aluminum or copper foil, and a suitable pressure sensitive adhesive coating containing finely divided silver. By way of example, a suitable conductive adhesive tape may be prepared as follows:

A mixture of 35 parts by weight of polyisobutylene (in a medium molecular weight range) and 200 parts of naphtha (solvent) is heated until the polyisobutylene is completely dissolved in the naptha. About 4 parts of dioctyl phthalate (plasticizer) is then added to the solution after which 40 parts of finely divided silver are slowly incorporated in the liquid with constant stirring. When this mass has been thoroughly mixed, it is ready for application to the backing of, for example, aluminum foil. A coating of the adhesive mixture may be applied to the foil by spraying or other suitable means. Evaporation of the solvent leaves a tacky film which readily adheres to dry surfaces.

It will be appreciated that the conductive tape may be applied in various ways in interconnecting the cells of a battery. One such alternative is illustrated in Fig. 5. In this structure, the tape segment 7 is inside of the cell envelope 5, the tape adhering to the inner surface of the envelope to seal the cell and having an adhesive area exposed through opening 10 which, in this case, is shown to be rectangular. The back of the tape is in contact with the cell electrode. If desired, both surfaces of the conductive backing may be coated by the conductive adhesive material. Batteries are assembled from these cells in the same manner as described above, the exposed areas of the tape segments 7 of adjacent cells being brought into adhesive engagement by the pressure exerted upon the stack of cells forming the battery assembly.

Invention is claimed as follows:

1. In a battery comprising a plurality of juxtaposed cells, each said cell having a pair of opposite electrodes at the sides thereof which are contiguous to adjacent cells, an apertured partition of non-conductive film material separating adjacent cells, and means for electrically interconnecting said cells comprising segments of electrically conductive adhesive tape spanning said apertures in said partitions and electrically engaging conductive elements of adjoining cells, said tape comprising an electrically conductive sheet material with a coating of an electrically conductive pressure sensitive adhesive material on a surface thereof.

2. In a battery comprising a plurality of juxtaposed cells, each said cell having a pair of opposite electrodes at the sides thereof which are contiguous to adjacent cells, an apertured partition of non-conductive film material separating adjacent cells, and means for electrically interconnecting said cells comprising segments of electrically conductive adhesive tape spanning said apertures in said partitions and electrically engaging conductive elements of adjoining cells, said tape comprising a metal foil with a coating of an electrically conductive pressure sensitive adhesive material on a surface thereof.

3. In a battery comprising a plurality of juxtaposed cells, each said cell having a pair of opposite electrodes at the sides thereof which are contiguous to adjacent cells, an apertured partition of non-conductive film material separating adjacent cells, and means for electrically interconnecting said cells comprising segments of electrically conductive adhesive tape spanning said apertures in said partitions and electrically engaging conductive elements of adjoining cells, said tape comprising aluminium foil with a coating of an electrically conductive pressure sensitive adhesive material on a surface thereof.

4. In a battery comprising a plurality of juxtaposed cells, each said cell having a pair of opposite electrodes at the sides thereof which are contiguous to adjacent cells, an apertured partition of non-conductive film material separating adjacent cells, and means for electrically interconnecting said cells comprising segments of electrically conductive adhesive tape spanning said apertures in said partitions and electrically engaging conductive elements of adjoining cells, said tape comprising an electrically conductive sheet material with a coating of an electrically conductive pressure sensitive adhesive material on a surface thereof, said segments overlapping and adhesively engaging a substantial area of the film material surrounding each aperture whereby to securely seal said apertures.

5. In a battery comprising a plurality of juxtaposed cells, each said cell being enclosed within an envelope of non-conductive film material and having a pair of opposite electrodes at the sides thereof which are contiguous to adjacent cells, each said envelope having apertures exposing a portion of the area of each said electrode, means for electrically interconnecting said cells comprising segments of electrically conductive adhesive tape spanning said apertures in said envelopes and electrically engaging an area of an electrode of one cell and an area of a tape segment of an adjacent cell, said tape comprising an electrically conductive sheet material with a coating of an electrically conductive pressure sensitive adhesive material on a surface thereof.

6. In a battery comprising a plurality of juxaposed cells, each said cell being enclosed within an envelope of non-conductive film material and having a pair of opposite electrodes at the sides thereof which are contiguous to adjacent cells, each said envelope having apertures exposing a portion of the area of each said electrode, means for electrically interconnecting said cells comprising segments of electrically conductive adhesive tape upon the external surfaces of each said envelope, said tape comprising an electrically conductive sheet material with a coating of an electrically conductive pressure sensitive adhesive material on a surface thereof, said tape segments covering the apertures in said envelopes and adherently engaging the areas of the electrodes underlying said apertures, the tape segments engaging the adjoining electrodes of adjacent cells being in electrical contact with each other.

7. In a battery comprising a plurality of juxtaposed cells, each said cell being enclosed within an envelope of non-conductive film material and having a pair of opposite electrodes at the sides thereof which are contiguous to adjacent cells, each said envelope having apertures exposing a portion of the area of each said electrode, means for electrically interconnecting said cells comprising segments of electrically conductive adhesive tape upon the internal surfaces of each said envelope, said tape comprising an electrically conductive sheet material with a coating of an electrically conductive pressure sensitive adhesive material on a surface thereof, said tape segments covering the apertures in said envelopes and respectively electrically engaging one electrode of a cell, the tape segments of adjacent cells adherently engaging each other through said apertures.

JOSEPH J. COLEMAN.
SAM KURLANDSKY.

References Cited in the file of this patent

UNITED STATES PATENTS

| Number | Name | Date |
|---|---|---|
| 1,613,585 | Dam | Jan. 4, 1927 |
| 2,154,312 | MacCallum | Apr. 11, 1939 |
| 2,475,152 | Rock | July 5, 1949 |
| 2,487,985 | Ruben | Nov. 15, 1949 |
| 2,496,709 | Gelardin | Feb. 7, 1950 |
| 2,519,053 | Reinhardt | Aug. 15, 1950 |
| 2,519,054 | Woodring | Aug. 15, 1950 |
| 2,519,527 | Wilkinson | Aug. 22, 1950 |

FOREIGN PATENTS

| Number | Country | Date |
|---|---|---|
| 235,835 | Switzerland | May 1, 1945 |